L. E. FRYE.
TIRE PROTECTOR.
APPLICATION FILED JAN. 13, 1913.
1,104,181.  Patented July 21, 1914.
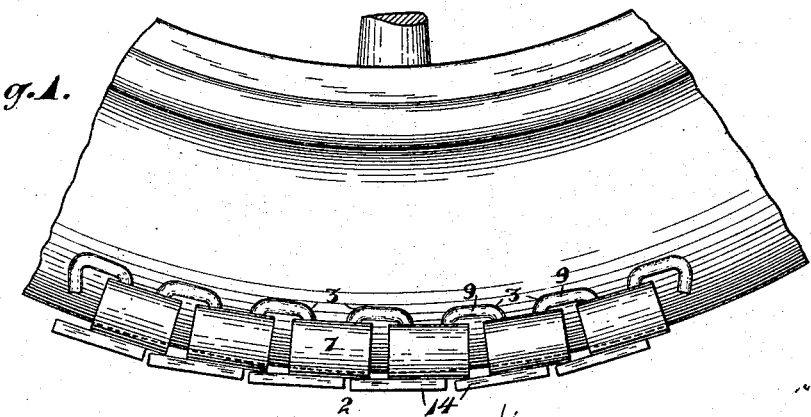
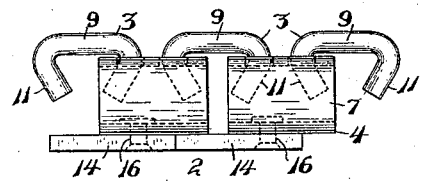
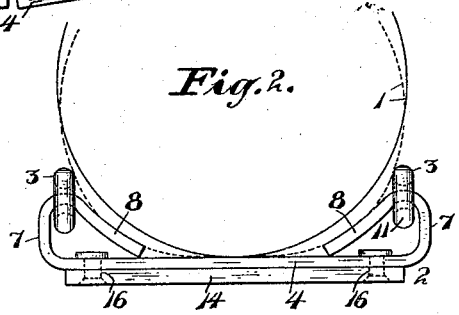
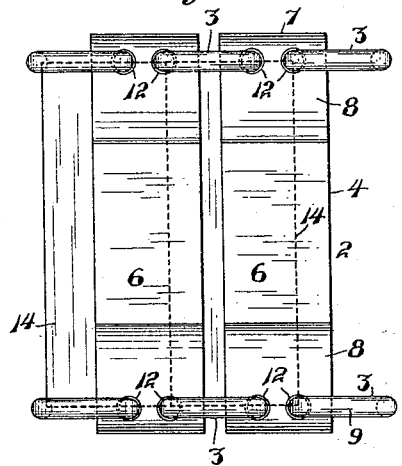
WITNESSES
INVENTOR.
Lee E. Frye
BY Francis M. Wright,
his ATTORNEY

UNITED STATES PATENT OFFICE.

LEE E. FRYE, OF SAN FRANCISCO, CALIFORNIA.

TIRE-PROTECTOR.

1,104,181.  Specification of Letters Patent.  Patented July 21, 1914.

Application filed January 13, 1913. Serial No. 741,744.

*To all whom it may concern:*

Be it known that I, LEE E. FRYE, a citizen of the United States, residing at San Francisco, in the county of San Francisco and State of California, have invented new and useful Improvements in Tire-Protectors, of which the following is a specification.

The object of the present invention is to provide an improved protector for pneumatic and other tires, which will be cheap in construction, easily fitted to the tire, effectually prevent puncturing of the tire, and will not impair its resiliency.

In the accompanying drawing, Figure 1 is a broken side view of a wheel tire equipped with my invention; Fig. 2 is a transverse sectional view, on an enlarged scale, of the tire protector, the tire being indicated in full lines in its normal position, and in dotted lines in its compressed position; Fig. 3 is a side view of a portion of a tire protector removed; Fig. 4 is a plan view of the same.

Referring to the drawing, 1 indicates a wheel tire to which my protector is shown as applied. Said protector consists of an annular series of units 2 connected together by pairs of links 3 to form an endless chain. Each unit comprises a body 4, which, in the form of the invention shown in Figs. 1 to 4, consists of a strip 6 of sheet metal extending across the tire, and bent at its ends first inward or at right angles as shown at 7 and then again inward at an acute angle as shown at 8. Each body is movably connected to the adjacent body by means of two links 3, one at each end thereof, each link being formed of thick wire having a straight central portion 9, and terminal portions 11 bent at an acute angle to said straight portion. Said terminal portions are passed through apertures 12 in the parts between the portions 7 and 8 of the respective adjacent bodies. Each unit in addition comprises a shoe 14, which, in the form of the invention shown in Figs. 1 to 4, is a flat strip of sheet metal secured by rivets 16 to one side of the body the remainder of the body projecting beyond the shoe, and overlapping a terminal portion of the next adjacent shoe, to which it is not secured, and a part only of said shoe extending beneath, or in contact with, said body, and the remainder extending beneath the space between two adjacent bodies and overlapping the terminal part of the next adjacent body, said shoes being of such width that, when the tire protector is removal from the tire and laid flat or straight, adjacent shoes contact with each other.

It will be seen that the above tire protector very effectively protects the tire from being punctured. When the tire protector is secured around the tire, the ends of the shoes are separated from each other only by a very small space, and this space is closed against access to the tire by the overhanging body secured to one of said shoes, effectively preventing a nail or other pointed object on the ground coming in contact with the tire and puncturing the same. Although the bodies are spaced from one another at their ends, the shoes in like manner close said spaces against the access to said tire of such pointed object.

The motion of parts tending to produce friction is only the very small angular motion of the links due to the relative change in position of said bodies and links resulting from compression and expansion of the tire, and this movement is so slight that it does not materially impair the resiliency of the tire. It will be seen that the tire protector is cheap, and is easily adjusted in place.

It will be observed that each shoe covers or closes the space between two adjacent bodies, and each body closes the space between two adjacent shoes.

An important feature of my invention consists in the provision of the flat shoe on the tire protector, which, on account of the large friction surface in contact with the ground, effectually prevents the tire from skidding.

It will be observed that, in my invention, for the first time, so far as I am aware, the links 3 which connect the bodies 4 extend inwardly, or toward the center of the wheel, and are contained wholly between the bounding planes of the bodies 4, that is, the two planes parallel with the wheel, which pass through the outer surfaces of all the portions 7 of said bodies 4. By reason of this construction, said links are by said bodies 4 fully protected from injury such as that which would otherwise be caused by impinging at a high speed against a curbstone or the like. In such a case, were these links not protected by the body portions, they would, by the impact against the curbstones, be broken or sheared off from the tire protector.

I claim:—

A tire protector composed of units each comprising a sheet metal body extending across the tire and bent at its ends, first, inward, then again back toward the central portion to make an acute angle therewith, and having apertures near the ends of each inwardly projecting portion, and a shoe, rigid with the body and staggered relatively thereto in a circumferential direction, and links each having hook-shaped ends passing respectively through said apertures of adjacent bodies, said links extending inwardly wholly in planes between the bounding planes of the bodies.

In testimony whereof I have hereunto set my hand in the presence of two subscribing witnesses.

LEE E. FRYE.

Witnesses:
FRANCIS M. WRIGHT,
D. B. RICHARDS.

Copies of this patent may be obtained for five cents each, by addressing the "Commissioner of Patents, Washington, D. C."